United States Patent
Aiba et al.

(10) Patent No.: US 12,243,984 B2
(45) Date of Patent: *Mar. 4, 2025

(54) APPARATUS FOR PRODUCING NON-AQUEOUS ELECTROLYTIC SOLUTION AND METHOD FOR PRODUCING NON-AQUEOUS ELECTROLYTIC SOLUTION

(71) Applicant: ORGANO CORPORATION, Tokyo (JP)

(72) Inventors: Kenta Aiba, Tokyo (JP); Akira Nakamura, Tokyo (JP); Eiya Yao, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 726 days.

This patent is subject to a terminal disclaimer.

(21) Appl. No.: 17/287,829

(22) PCT Filed: Sep. 27, 2019

(86) PCT No.: PCT/JP2019/038124
§ 371 (c)(1),
(2) Date: Apr. 22, 2021

(87) PCT Pub. No.: WO2020/085001
PCT Pub. Date: Apr. 30, 2020

(65) Prior Publication Data
US 2021/0384557 A1    Dec. 9, 2021

(30) Foreign Application Priority Data

Oct. 24, 2018 (JP) ................................. 2018-199868
Oct. 24, 2018 (JP) ................................. 2018-199869

(51) Int. Cl.
*H01M 10/0568* (2010.01)
*B01J 41/07* (2017.01)
(Continued)

(52) U.S. Cl.
CPC ......... *H01M 10/0568* (2013.01); *B01J 41/07* (2017.01); *B01J 41/13* (2017.01);
(Continued)

(58) Field of Classification Search
CPC ......... H01M 10/0568; H01M 10/0569; H01M 2300/0028; B01J 41/07; B01J 41/13
See application file for complete search history.

(56) References Cited

U.S. PATENT DOCUMENTS

| 6,001,325 | A | 12/1999 | Salmon et al. |
| 6,033,808 | A * | 3/2000 | Salmon ................. H01M 6/162 429/188 |
| 2012/0261328 | A1 | 10/2012 | Shimada et al. |

FOREIGN PATENT DOCUMENTS

| EP | 2 030 992 A1 | 3/2009 |
| EP | 3 866 247 A1 | 8/2021 |

(Continued)

OTHER PUBLICATIONS

English translation of JP Publication H11-185810, Jul. 1999.*
(Continued)

*Primary Examiner* — Brittany L Raymond
(74) *Attorney, Agent, or Firm* — GREENBLUM & BERNSTEIN P.L.C.

(57) ABSTRACT

Provided is an apparatus for producing a non-aqueous electrolytic solution capable of easily performing purification treatment by removal of acidic impurities such as hydrogen fluoride contained in a non-aqueous electrolytic solution.
The apparatus for producing a non-aqueous electrolytic solution comprises an ion exchange unit accommodating a
(Continued)

weakly basic anion exchange resin through which an alkali metal salt electrolyte-containing solution having the alkali metal salt electrolyte dispersed in an carbonate ester is passed to obtain the non-aqueous electrolytic solution, wherein the weakly basic anion exchange resin has a styrene-based resin as substrate and an amino group as weakly basic anion exchange group.

12 Claims, 1 Drawing Sheet

(51) Int. Cl.
 *B01J 41/13* (2017.01)
 *H01M 10/0525* (2010.01)
 *H01M 10/0569* (2010.01)
(52) U.S. Cl.
 CPC ... *H01M 10/0525* (2013.01); *H01M 10/0569* (2013.01); *H01M 2300/0028* (2013.01)

(56) References Cited

FOREIGN PATENT DOCUMENTS

| JP | 11-185810 | | 7/1999 |
|---|---|---|---|
| JP | H11-185810 | * | 7/1999 |
| JP | 2000-505042 | | 4/2000 |
| JP | 2011-71111 | | 4/2011 |
| JP | 2019/053980 A | | 4/2019 |
| WO | 2011/074631 | | 6/2011 |
| WO | 2018/110177 A1 | | 6/2018 |
| WO | 2019/054220 A1 | | 3/2019 |
| WO | 2020/075529 A1 | | 4/2020 |

OTHER PUBLICATIONS

Office Action issued Jul. 29, 2023 in Chinese family member application No. 201980064421.1 and English language translation thereof.
Official Communication issued in International Patent Application No. PCT/JP2019/038124, dated Dec. 10, 2019, along with English language translation thereof.
Official Action issued Apr. 11, 2023 in family member Japanese Patent Application No. 2018-199869 and English translation thereof.
Extended European Search Report issued in the corresponding European Patent Application No. 19877049.7 dated Jul. 1, 2022.
Office Action that issued in corresponding Chinese Patent Application No. 201980064421.1 dated Feb. 8, 2024, along with English translation thereof.

* cited by examiner

[Figure 1]
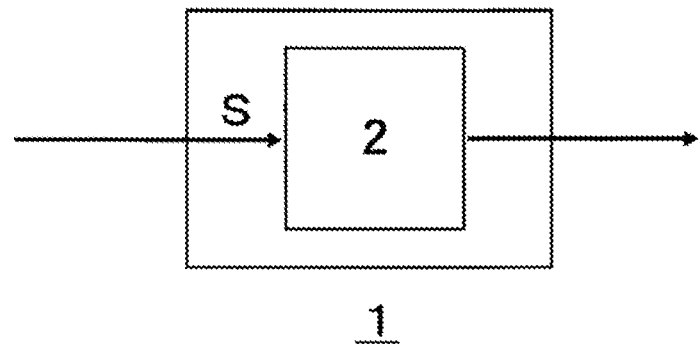
[Figure 2]
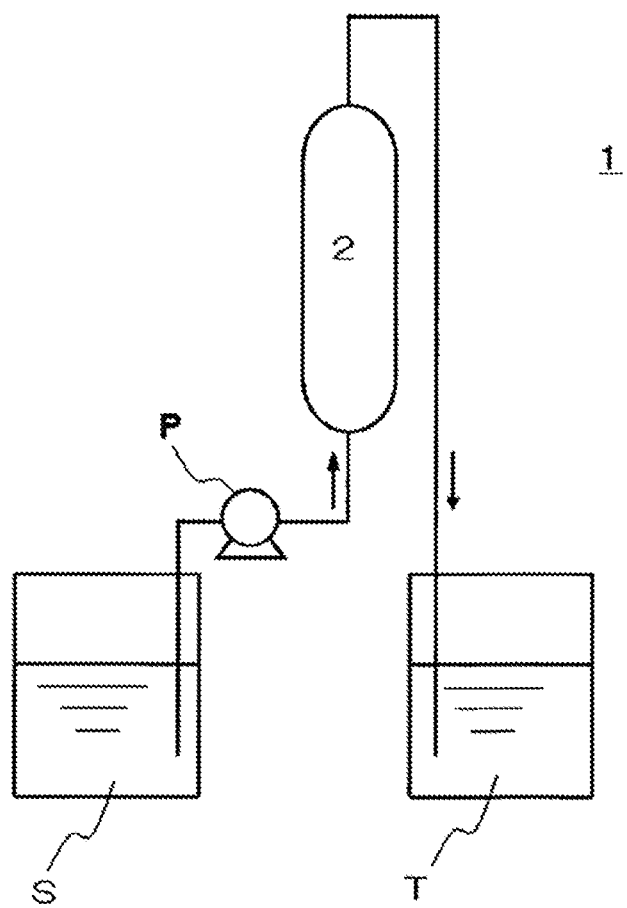

APPARATUS FOR PRODUCING NON-AQUEOUS ELECTROLYTIC SOLUTION AND METHOD FOR PRODUCING NON-AQUEOUS ELECTROLYTIC SOLUTION

TECHNICAL FIELD

The present invention relates to an apparatus for producing a non-aqueous electrolytic solution and a method for producing a non-aqueous electrolytic solution.

BACKGROUND ART

In a lithium ion battery, a non-aqueous electrolytic solution made of a lithium-based electrolyte such as lithium hexafluorophosphate ($LiPF_6$) dissolved in an organic non-aqueous solvent is used as the electrolytic solution.

However, a small amount of moisture remains in the solvent and the lithium-based electrolyte to constitute the electrolytic solution, and the moisture reacts with the lithium-based electrolyte such as $LiPF_6$ to generate hydrogen fluoride (HF) and the like as shown, for example, in the following reaction formulas (1) to (3).

$$LiPF_6 + H_2O \rightarrow LiF + 2HF + POF_3 \qquad (1)$$

$$POF_3 + H_2O \rightarrow POF_2(OH) + HF \qquad (2)$$

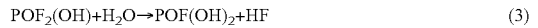
$$POF_2(OH) + H_2O \rightarrow POF(OH)_2 + HF \qquad (3)$$

The presence of acidic impurities such as hydrogen fluoride in the electrolytic solution tends to cause degradation of the battery capacity and charge/discharge cycle characteristics of a lithium-ion battery as well as corrosion inside the battery (Refer to Patent Literature 1 (Japanese Patent Laid-Open No. 2011-71111) and the like.).

CITATION LIST

Patent Literature

[Patent Literature 1]
Japanese Patent Laid-Open No. 2011-71111

SUMMARY OF INVENTION

Technical Problem

For this reason, a method for removing acidic impurities such as hydrogen fluoride from an electrolytic solution has been required. As the method for removing the acidic impurities, a method of bringing an electrolytic solution for a lithium ion battery into contact with a weakly basic anion exchange resin that contains an anion exchange group having a tertiary amine structure (tertiary amino group) is conceivable.

However, through studies by the present inventors, it has been found that when the weakly basic anion exchange resin is brought into contact with the electrolytic solution for a lithium ion battery, a quaternization reaction is caused to modify the tertiary amino group into a quaternary ammonium group by an carbonate ester solvent in the electrolytic solution.

The anion exchange group modified by the quaternization reaction has improved adsorptive properties, so that other components besides the acidic impurities in the electrolytic solution are easily adsorbed. As a result, it becomes difficult to selectively remove acidic impurities.

As described above, according to the study by the present inventors, it has been found that, unlike in water, acidic impurities such as hydrogen fluoride cannot be well removed in a non-aqueous electrolytic solution depending on type of the weakly basic anion exchange resin, so that a target quality of the electrolytic solution cannot be achieved in some cases.

Under such a circumstance, an object of the present invention is to provide an apparatus for producing a non-aqueous electrolytic solution, capable of easily performing purification treatment by removal of acidic impurities such as hydrogen fluoride contained in a non-aqueous electrolytic solution such as electrolytic solution for a lithium ion battery, and to provide a method for producing a non-aqueous electrolytic solution.

As a result of extensive studies to achieve the object by the present inventors, it has been found that by an apparatus for producing a non-aqueous electrolytic solution and a method for producing a non-aqueous electrolytic solution described below, the above technical problems can be solved, so that the present invention has been completed based on the founding.

In other words, the present invention provides the following.

(1) An apparatus for producing a non-aqueous electrolytic solution comprising:

an ion exchange unit accommodating a weakly basic anion exchange resin through which an alkali metal salt electrolyte-containing solution having the alkali metal salt electrolyte dispersed in an carbonate ester is passed to obtain the non-aqueous electrolytic solution, wherein the weakly basic anion exchange resin has a styrene-based resin as substrate and a tertiary amino group as weakly basic anion exchange group.

(2) The apparatus for producing a non-aqueous electrolytic solution according to item (1) comprising:

an ion exchange unit accommodating a weakly basic anion exchange resin through which an alkali metal salt electrolyte-containing solution having the alkali metal salt electrolyte dispersed in an carbonate ester is passed to obtain the non-aqueous electrolytic solution, wherein the weakly basic anion exchange resin has a styrene-based resin as substrate and a tertiary amino group as weakly basic anion exchange group, and has a total ion exchange capacity of 0.1 to 3.0 eq/L-R before treatment of the alkali metal salt electrolyte-containing solution (hereinafter, appropriately referred to as an aspect 1 of the production apparatus of the present invention).

(3) The apparatus for producing a non-aqueous electrolytic solution according to item (1) comprising:

an ion exchange unit accommodating a weakly basic anion exchange resin through which an alkali metal salt electrolyte-containing solution having the alkali metal salt electrolyte dispersed in an carbonate ester is passed to obtain the non-aqueous electrolytic solution, wherein the weakly basic anion exchange resin has a styrene-based resin as substrate and a tertiary amino group represented by the following general formula (I) as weakly basic anion exchange group:

[Chemical formula 1]

(I)

wherein $R^1$ and $R^2$ are hydrocarbon groups having 1 to 3 carbon atoms, which may be the same or different from each other, and * represents a bonding site bonding with a substrate or a bonding group for bonding to a substrate (hereinafter, appropriately referred to as an aspect 2 of the production apparatus of the present invention).

(4) The apparatus for producing a non-aqueous electrolytic solution according to item (3), wherein the weakly basic anion exchange group is represented by the following general formula (II):

[Chemical Formula 2]

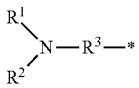
(II)

wherein $R^1$ and $R^2$ are hydrocarbon groups having 1 to 3 carbon atoms, which may be the same or different from each other, $R^3$ is a hydrocarbon group having 1 to 3 carbon atoms, and * represents a bonding site bonding with a substrate.

(5) The apparatus for producing a non-aqueous electrolytic solution according to item (3) or (4), wherein the weakly basic anion exchange group represented by the general formula (I) or general formula (II) is a dimethylaminomethyl group.

(6) The apparatus for producing a non-aqueous electrolytic solution according to any one of items (1) to (5), wherein the styrene-based resin is a styrene-divinylbenzene copolymer.

(7) The apparatus for producing a non-aqueous electrolytic solution according to any one of items (1) to (6), wherein the non-aqueous electrolytic solution is an electrolytic solution for a lithium ion battery.

(8) A method for producing a non-aqueous electrolytic solution comprising:

an acid adsorption step of passing an alkali metal salt electrolyte-containing solution having the alkali metal salt electrolyte dispersed in an carbonate ester through an ion exchange unit accommodating a weakly basic anion exchange resin to obtain the non-aqueous electrolytic solution, wherein the weakly basic anion exchange resin has a styrene-based resin as substrate and a tertiary amino group as weakly basic anion exchange group.

(9) The method for producing a non-aqueous electrolytic solution according to item (8) comprising:

an acid adsorption step of passing an alkali metal salt electrolyte-containing solution having the alkali metal salt electrolyte dispersed in an carbonate ester through an ion exchange unit accommodating a weakly basic anion exchange resin to obtain the non-aqueous electrolytic solution, wherein the weakly basic anion exchange resin has a styrene-based resin as substrate and a tertiary amino group as weakly basic anion exchange group, and has a total ion exchange capacity of 0.1 to 3.0 eq/L-R before treatment of the alkali metal salt electrolyte-containing solution (hereinafter, appropriately referred to as an aspect 1 of the production method of the present invention).

(10) The method for producing a non-aqueous electrolytic solution according to item (8) comprising:

an acid adsorption step of passing an alkali metal salt electrolyte-containing solution having the alkali metal salt electrolyte dispersed in an carbonate ester through an ion exchange unit accommodating a weakly basic anion exchange resin to obtain the non-aqueous electrolytic solution, wherein the weakly basic anion exchange resin has a styrene-based resin as substrate and a tertiary amino group represented by the following general formula (I) as weakly basic anion exchange group:

[Chemical Formula 3]

(I)

wherein $R^1$ and $R^2$ are hydrocarbon groups having 1 to 3 carbon atoms, which may be the same or different from each other, and * represents a bonding site bonding with a substrate or a bonding group for bonding to a substrate (hereinafter, appropriately referred to as an aspect 2 of the production method of the present invention).

(11) The method for producing a non-aqueous electrolytic solution according to item (10), wherein the weakly basic anion exchange group is represented by the following general formula (II):

[Chemical Formula 4]

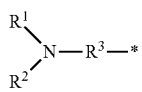
(II)

wherein $R^1$ and $R^2$ are hydrocarbon groups having 1 to 3 carbon atoms, which may be the same or different from each other, $R^3$ is a hydrocarbon group having 1 to 3 carbon atoms, and * represents a bonding site bonding with a substrate.

(12) The method for producing a non-aqueous electrolytic solution according to item (10) or (11), wherein the weakly basic anion exchange group represented by the general formula (I) or general formula (II) is a dimethylaminomethyl group.

(13) The method for producing a non-aqueous electrolytic solution according to any one of items (8) to (12), wherein the styrene-based resin is a styrene-divinylbenzene copolymer.

(14) The method for producing a non-aqueous electrolytic solution according to any one of items (8) to (13), wherein the non-aqueous electrolytic solution is an electrolytic solution for a lithium ion battery.

Advantageous Effect of Invention

According to the present invention, an apparatus for producing a non-aqueous electrolytic solution and a method for producing a non-aqueous electrolytic solution, capable of easily performing purification treatment by removal of acidic impurities such as hydrogen fluoride contained in a non-aqueous electrolytic solution, can be provided.

BRIEF DESCRIPTION OF DRAWINGS

FIG. 1 is a chart illustrating the structure of an apparatus for producing a non-aqueous electrolytic solution of the present invention.

FIG. 2 is a chart showing an illustrative aspect of the apparatus for producing a non-aqueous electrolytic solution of the present invention.

DESCRIPTION OF EMBODIMENT

First, the apparatus for producing a non-aqueous electrolytic solution of the present invention is described.

The apparatus for producing a non-aqueous electrolytic solution comprises an ion exchange unit accommodating a weakly basic anion exchange resin through which an alkali metal salt electrolyte-containing solution having the alkali metal salt electrolyte dispersed in an carbonate ester is passed to obtain the non-aqueous electrolytic solution,
wherein the weakly basic anion exchange resin has a styrene-based resin as substrate and a tertiary amino group as weakly basic anion exchange group.

Examples of the apparatus for producing a non-aqueous electrolytic solution of the present invention include an aspect 1 of the production apparatus of the present invention and an aspect 2 of the production apparatus of the present invention, which are described below.

The aspect 1 of the production apparatus of the present invention comprises:
an ion exchange unit accommodating a weakly basic anion exchange resin through which an alkali metal salt electrolyte-containing solution having the alkali metal salt electrolyte dispersed in an carbonate ester is passed to obtain a non-aqueous electrolytic solution,
wherein the weakly basic anion exchange resin has a styrene-based resin as substrate and a tertiary amino group as weakly basic anion exchange group, and has a total ion exchange capacity of 0.1 to 3.0 eq/L-R before treatment of the alkali metal salt electrolyte-containing solution.

FIG. 1 is a chart illustrating a structure of a production apparatus of the present invention in the aspect 1.

As shown in FIG. 1, the production apparatus of the present invention in the aspect 1 has an ion exchange unit 2 accommodating a weakly basic anion exchange resin through which an alkali metal salt electrolyte-containing solution S with the alkali metal salt electrolyte such as lithium-based electrolyte dispersed in an carbonate ester is passed to obtain a non-aqueous electrolytic solution.

In the aspect 1 of the production apparatus of the present invention, examples of the carbonate ester include one or more selected from a cyclic carbonate ester and a linear carbonate ester.

Examples of the cyclic carbonate ester include one or more selected from ethylene carbonate and propylene carbonate. Examples of the linear carbonate include one or more selected from dimethyl carbonate, diethyl carbonate, and ethyl methyl carbonate.

In the aspect 1 of the production apparatus of the present invention, examples of the alkali metal salt electrolyte include a lithium-based electrolyte. Examples of the lithium-based electrolyte include one or more selected from $LiPF_6$, $LiClO_4$, $LiBF_4$, $LiAsF_6$, $LiSbF_6$, $LiAlCl_4$ and $LiCF_3SO_3$, and $LiPF_6$ is preferred in view of battery performance.

In the aspect 1 of the production apparatus of the present invention, an electrolytic solution for a lithium-ion battery is suitable as the non-aqueous electrolytic solution.

In the aspect 1 of the production apparatus of the present invention, the concentration of the alkali metal salt in the alkali metal salt electrolyte-containing solution is preferably 0.5 to 2.0 mol/L, more preferably 0.5 to 1.2 mol/L, still more preferably 0.8 to 1.2 mol/L.

The preparation method of the alkali metal salt electrolyte-containing solution is not particularly limited, and the solution may be prepared, for example, by adding an alkali metal salt electrolyte into an carbonate ester so as to be dissolved under an inert gas atmosphere.

The production apparatus of the present invention in the aspect 1 has an ion exchange unit accommodating a weakly basic anion exchange resin through which an alkali metal salt electrolyte-containing solution (unpurified non-aqueous electrolytic solution) is passed.

In the aspect 1 of the production apparatus of the present invention, the weakly basic anion exchange resin used in the ion exchange unit has a styrene-based resin as substrate.

In the present application document, the styrene-based resin means a resin containing 50 mass % or more of structural units derived from styrene or a styrene derivative, obtained by homopolymerizing or copolymerizing styrene or a styrene derivative.

Examples of the styrene derivative include one or more selected from α-methylstyrene, vinyltoluene, chlorostyrene, ethylstyrene, i-propylstyrene, dimethylstyrene and bromostyrene.

The styrene-based resin may be a copolymer with another copolymerizable vinyl monomer as long as the resin contains a homopolymer or a copolymer of styrene or a styrene derivative as the main component. Examples of the vinyl monomer include a polyfunctional monomers including a divinylbenzene such as o-divinylbenzene, m-divinylbenzene and p-divinylbenzene, an alkylene glycol di(meth)acrylate such as ethylene glycol di(meth)acrylate and polyethylene glycol di(meth)acrylate, and one or more selected from (meth)acrylonitrile, methyl (meth)acrylate, etc.

As the other copolymerizable vinyl monomer, ethylene glycol di(meth)acrylate, polyethylene glycol di(meth)acrylate having 4 to 16 polymerized ethylene units and divinylbenzene are more preferred, divinylbenzene and ethylene glycol di(meth)acrylate are still more preferred, and divinylbenzene is furthermore preferred.

In the aspect 1 of the production apparatus of the present invention, the weakly basic anion exchange resin used in the ion exchange unit has a tertiary amine group as the weakly basic anion exchange group.

Example of the tertiary amino group include one represented by the following general formula (I):

[Chemical Formula 5]

(I)

wherein $R^1$ and $R^2$ are hydrocarbon groups having 1 to 3 carbon atoms, which may be the same or different from each other, and * represents a bonding site bonding with a substrate or a bonding group for bonding to a substrate.

In the weakly basic anion exchange group represented by the general formula (I), the group $R^1$ and the group $R^2$ are hydrocarbon groups having 1 to 3 carbon atoms.

Examples of the group $R^1$ and the group $R^2$ include one or more selected from an alkyl group and an alkenyl group, and an alkyl group is preferred.

Specific examples of the group $R^1$ and the group $R^2$ include one or more selected from a methyl group, an ethyl group, a propyl group, and a propylene group, and a methyl group is preferred.

In the weakly basic anion exchange group represented by the general formula (I), the group $R^1$ and the group $R^2$ may be the same or different from each other.

Examples of the weakly basic anion exchange group represented by the general formula (I) include a dimethylamino group, a diethylamino group, and a dipropylamino group, and a dimethylamino group is preferred.

In the general formula (I), * represents a bonding site between a weakly basic anion exchange group represented by the general formula (I) and a substrate or a bonding group for bonding with a substrate.

It is preferable that the weakly basic anion exchange group represented by the general formula (I) be appropriately bonded to a substrate made of styrene-based resin through a group $R^3$ group as bonding group, as shown in the following general formula (II).

[Chemical Formula 6]

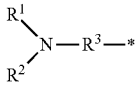

(II)

wherein $R^1$ and $R^2$ are hydrocarbon groups having 1 to 3 carbon atoms, which may be the same or different from each other, $R^3$ is a hydrocarbon group having 1 to 3 carbon atoms, and * represents a bonding site bonding with a substrate.

Examples of the group $R^1$ and the group $R^2$ include the same ones as in the above.

The group $R^3$ is a hydrocarbon group having 1 to 3 carbon atoms. Examples of the group $R^3$ include one or more selected from an alkylene group and an alkenylene group, and an alkylene group is preferred.

Specific examples of the group $R^3$ include one or more selected from a methylene group ($-CH_2-$), an ethylene group ($-CH_2CH_2-$), and a propylene group ($-CH_2CH_2CH_2-$), and a methylene group is preferred.

The weakly basic anion exchange group represented by the general formula (I) is introduced as a substituent into styrene or a styrene derivative, so that introduction into a styrene-based resin can be achieved.

In the aspect 1 of the production apparatus of the present invention, the weakly basic anion exchange resin used in the ion exchange unit has a total ion exchange capacity of 0.1 to 3.0 eq/L-R before treatment of the alkali metal salt electrolyte-containing solution.

In the aspect 1 of the production apparatus of the present invention, the weakly basic anion exchange resin used in the ion exchange unit has a total ion exchange capacity of 0.1 to 3.0 eq/L-R, more preferably 0.5 to 2.5 eq/L-R, still more preferably 1.0 to 2.0 eq/L-R, before treatment of the alkali metal salt electrolyte-containing solution.

In the present application document, the total ion exchange capacity means a value calculated by a method described below.

In the weakly basic anion exchange resin having amino groups as the weakly basic anion exchange groups, the total ion exchange capacity means the ion exchange capacity of a primary amino group, a secondary amino group, a tertiary amino group and a quaternary amino group in total.

In the aspect 1 of the production apparatus of the present invention, a weakly basic anion exchange resin having a styrene-based resin as substrate and a tertiary amino group as weakly basic anion exchange group, with a total ion exchange capacity in the range before treatment of the alkali metal salt electrolyte-containing solution is used. As a result, in the purification treatment by adsorbing acidic impurities such as hydrogen fluoride contained in the alkali metal salt electrolyte-containing solution to the weakly basic anion exchange resin having an amino group, the purification treatment can be easily performed, with the modification of the tertiary amino group as weakly basic anion exchange group into a quaternary amino group effectively prevented.

In the present application document, the total ion exchange capacity is defined as follows. The weakly basic anion exchange resin in a wet state before treatment of the alkali metal salt electrolyte-containing solution is completely converted into a chloride ion form with hydrochloric acid, and excessive hydrochloric acid is then washed away with ethanol. An ammonia water is then passed through to define the amount of chloride ions eluting off as the amino group exchange capacity. Subsequently, a sodium nitrate solution is passed through to define the amount of chloride ions eluting off as the neutral salt decomposition capacity. The amino group exchange capacity and the neutral salt decomposition capacity in total is defined as the total ion exchange capacity.

The weakly basic anion exchange resin accommodated in an ion exchange unit may have any structure selected from a gel-type structure, a macroporous-type (MR-type) structure, and a porous-type structure, and the resin having a macroporous-type structure is preferred.

The size of the weakly basic anion exchange resin is not particularly limited, and the harmonic mean diameter of the resin is preferably 300 to 1000 μm, more preferably 400 to 800 μm, still more preferably 500 to 700 μm.

Such a weakly basic anion exchange resin may be a commercially available product, and examples thereof include one or more selected from DIAION WA30 manufactured by Mitsubishi Chemical Corporation and ORLITE DS-6 manufactured by Organo Corporation.

In the aspect 1 of the production apparatus of the present invention, the accommodation aspect of the weakly basic anion exchange resin accommodated in the ion exchange unit is not particularly limited as long as the aspect allows the alkali metal salt electrolyte-containing solution to be brought into contact with the weakly basic anion exchange resin.

For example, the ion exchange unit may be a column or tank filled with a weakly basic anion exchange resin through which an alkali metal salt electrolyte-containing solution can be passed.

Further, the ion exchange unit may be equipped with a pump for passing an alkali metal salt electrolyte-containing solution.

In the aspect 1 of the production apparatus of the present invention, the liquid flow rate (liquid space velocity) of the alkali metal salt electrolyte-containing solution passing through the weakly basic anion exchange apparatus in the ion exchange unit may be appropriately selected from the rates at which acidic impurities in the alkali metal salt electrolyte-containing solution can be removed.

The treatment by the weakly basic anion exchange resin may include, for example, the successive steps of washing a weakly basic anion exchange resin with an carbonate ester solvent that constitutes the alkali metal salt electrolyte-containing solution to be treated, drying the resin at about 40 to 80° C. under reduced pressure, swelling the weakly basic anion exchange resin with the carbonate ester solvent that constitutes the alkali metal salt electrolyte-containing solution to be treated again, and filling a column with the resin.

Then, after performing backwashing, extrusion, etc., according to the conventional method, a step of passing the electrolytic solution to be treated is performed at an SV (flow rate/ion exchange resin volume ratio) of preferably 1 to 100 $hr^{-1}$, more preferably at an SV of 2 to 50 $hr^{-1}$, still more preferably at an SV of 5 to 20 $hr^{-1}$.

In the aspect 1 of the production apparatus of the present invention, the content of acidic impurities such as hydrogen fluoride in the acid adsorption-treated solution obtained from the ion exchange unit is preferably 20 mass ppm or less, more preferably 10 mass ppm or less, still more preferably 5 mass ppm or less.

Incidentally, in the present application document, the amount of acidic impurities means the value measured by neutralization titration method.

According to the aspect 1 of the production apparatus of the present invention, use of the weakly basic anion exchange resin accommodated in an ion exchange unit having a styrene-based resin as substrate and a tertiary amino group as weakly basic anion exchange group with a total ion exchange capacity calculated by the equation in the range enables to provide a production apparatus that allows, in the purification treatment by adsorbing acidic impurities such as hydrogen fluoride contained in a non-aqueous electrolytic solution to a weakly basic anion exchange resin having an amino group, the purification treatment to be easily performed with the modification of the tertiary amino group as weakly basic anion exchange group into a quaternary amino group effectively prevented.

Next, an aspect 2 of the production apparatus of the present invention is described.

The apparatus for producing a non-aqueous electrolytic solution in the aspect 2 comprising:
an ion exchange unit accommodating a weakly basic anion exchange resin through which an alkali metal salt electrolyte-containing solution having the alkali metal salt electrolyte dispersed in an carbonate ester is passed to obtain the non-aqueous electrolytic solution,
wherein the weakly basic anion exchange resin has a styrene-based resin as substrate and a tertiary amino group represented by the following general formula (I) as weakly basic anion exchange group:

[Chemical Formula 7]

(I)

wherein $R^1$ and $R^2$ are hydrocarbon groups having 1 to 3 carbon atoms, which may be the same or different from each other, and * represents a bonding site bonding with a substrate or a bonding group for bonding to a substrate.

The apparatus configuration in the aspect 2 of the production apparatus of the present invention is common to that in the aspect 1 of the production apparatus of the present invention, except that the weakly basic anion exchange group is limited to a specified one and the total ion exchange capacity of the weakly basic anion exchange resin before treatment of the alkali metal salt electrolyte-containing solution is not limited in a specified range.

Except for the above, the details of the apparatus configuration, the alkali electrolyte metal salt-containing solution to be treated, and the treatment aspect of alkali electrolyte metal salt-containing solution in the aspect 2 of the production apparatus of the present invention are therefore common to those described in the aspect 1 of the production apparatus of the present invention.

According to the aspect 2 of the production apparatus of the present invention, use of the weakly basic anion exchange resin accommodated in an ion exchange unit having a styrene-based resin as substrate and a specified weakly basic anion exchange group with a tertiary amine structure allows the acidic impurities in the electrolytic solution to be effectively adsorbed and removed, so that a production apparatus of the present invention capable of easily preparing a non-aqueous electrolytic solution having a reduced content of acidic impurities such as hydrogen fluoride through effective adsorption can be provided.

Next, a method for producing a non-aqueous electrolytic solution of the present invention is described.

The method for producing a non-aqueous electrolytic solution of the present invention comprises:
an acid adsorption step of passing an alkali metal salt electrolyte-containing solution having the alkali metal salt electrolyte dispersed in an carbonate ester through an ion exchange unit accommodating a weakly basic anion exchange resin to obtain the non-aqueous electrolytic solution,
wherein the weakly basic anion exchange resin has a styrene-based resin as substrate and a tertiary amino group as weakly basic anion exchange group.

Examples of the method for producing a non-aqueous electrolytic solution include an aspect 1 of the production method of the present invention and an aspect 2 of the production method of the present invention that are described below.

The aspect 1 of the production method of the present invention comprises an acid adsorption step of passing an alkali metal salt electrolyte-containing solution having the alkali metal salt electrolyte dispersed in an carbonate ester through an ion exchange unit accommodating a weakly basic anion exchange resin to obtain a non-aqueous electrolytic solution, wherein the weakly basic anion exchange resin has a styrene-based resin as substrate and a tertiary amino group as weakly basic anion exchange group, and has a total ion exchange capacity of 0.1 to 3.0 eq/L-R before treatment of the alkali metal salt electrolyte-containing solution.

Since the aspect 1 of the production method of the present invention is practically a method for producing a non-aqueous electrolytic solution by using the production apparatus of the present invention in the aspect 1, the details of the aspect 1 of the production method are common to the description of usage pattern of the production apparatus of the present invention in the aspect 1.

According to the aspect 1 of the production method of the present invention, use of the weakly basic anion exchange resin accommodated in an ion exchange unit having a styrene-based resin as substrate and a tertiary amino group as weakly basic anion exchange group with a total ion exchange capacity in the range before treatment of the alkali metal salt electrolyte-containing solution enables to provide a production method that allows, in the purification treatment by adsorbing acidic impurities such as hydrogen fluoride contained in a non-aqueous electrolytic solution to a weakly basic anion exchange resin having a tertiary amino group, the purification treatment to be easily performed with the modification of the tertiary amino group as weakly basic anion exchange group into a quaternary amino group effectively prevented.

Next, the aspect 2 of the production method of the present invention is described.

The aspect 2 of the production method of the present invention comprises:

an ion exchange unit accommodating a weakly basic anion exchange resin through which an alkali metal salt electrolyte-containing solution having the alkali metal salt electrolyte dispersed in an carbonate ester is passed to obtain a non-aqueous electrolytic solution, wherein the weakly basic anion exchange resin has a styrene-based resin as substrate and a tertiary amino group represented by the following general formula (I) as weakly basic anion exchange group:

[Chemical Formula 8]

(I)

wherein $R^1$ and $R^2$ are hydrocarbon groups having 1 to 3 carbon atoms, which may be the same or different from each other, and * represents a bonding site bonding with a substrate or a bonding group for bonding to a substrate.

Since the aspect 2 of the production method of the present invention is practically a method for producing a non-aqueous electrolytic solution by using the production apparatus of the present invention in the aspect 2, the details of the aspect 2 of the production method are common to the description of usage pattern of the production apparatus of the present invention in the aspect 2.

According to the aspect 2 of the production method of the present invention, a method for producing a non-aqueous electrolytic solution, capable of easily preparing a non-aqueous electrolytic solution with a content of acidic impurities such as hydrogen fluoride effectively reduced, can be provided.

EXAMPLES

Next, the present invention is described in more detail with reference to Examples, which are provided for exemplifying purposes and not intended to limit the present invention.

Example 1

An electrolytic solution was prepared by using an apparatus for producing an electrolytic solution for a lithium ion battery, as an aspect 1 of the production apparatus shown in FIG. 2.

In other words, as shown in FIG. 2, as an ion exchange unit 2 of an apparatus 1 for producing a non-aqueous electrolytic solution (apparatus for producing an electrolytic solution for a lithium ion battery), a column filled with a weakly basic anion exchange resin having styrene-divinylbenzene as substrate and dimethylamino group as weakly basic anion exchange group was prepared.

Subsequently, an electrolytic solution S with dissolved $LiPF_6$ at a concentration of 1 mol/L in a mixed solvent obtained by mixing ethylene carbonate and dimethyl carbonate at a volume ratio of 1:1 was passed through the column at a liquid flow rate of 10 (L/L-resin)/hr for 15 days, by using a pump P, and the electrolytic solution after passing was stored in a tank T.

The total ion exchange capacity of the weakly basic anion exchange resin before and after passing the liquid was measured by the following method. The results are shown in Table 1.

<Method for Measuring Total Ion Exchange Capacity>

The anion exchange resin is completely converted into a chloride ion form with hydrochloric acid, and excessive hydrochloric acid is then washed away with ethanol. An ammonia water is then passed through to define the amount of chloride ions eluting off as the amino group exchange capacity. Subsequently, a sodium nitrate solution is passed through to define the amount of chloride ions eluting off as the neutral salt decomposition capacity. The amino group exchange capacity and the neutral salt decomposition capacity in total is defined as the total ion exchange capacity.

The total ion exchange capacity means the amount of all the ion exchange groups (primary amino group to tertiary amino groups and quaternary ammonium groups in total), and the neutral salt decomposition capacity means the amount of quaternary ammonium groups.

In Table 1, both of the neutral salt decomposition capacity and the amino group exchange capacity before and after treatment of the electrolytic solution are described.

In Table 1, the proportion of the quaternary ammonium group in the total amount of functional groups calculated by the following equation is also described.

Proportion of quaternary ammonium group in total amount of functional groups (%)=(Neutral salt decomposition capacity (eq/L-R)/Total ion exchange capacity (eq/L-R))×100

Example 2 to Example 4

Each apparatus 1 for producing an electrolytic solution for a lithium ion battery was configured in the same manner as in Example 1, except that the column of an ion exchange unit 2 was filled with a weakly basic anion exchange resin having styrene-divinylbenzene as substrate and a dimethylamino group as weakly basic anion exchange group, each having a total ion exchange capacity shown in Table 1.

Subsequently, in the same manner as in Example 1, an electrolytic solution S with dissolved $LiPF_6$ at a concentration of 1 mol/L in a mixed solvent obtained by mixing ethylene carbonate and dimethyl carbonate at a volume ratio of 1:1 was passed through the column at a liquid flow rate of 10 (L/L-resin)/hr for 15 days, by using a pump P, and the electrolytic solution after passing was stored in a tank T.

The total ion exchange capacity of the weakly basic anion exchange resin before and after passing the liquid was measured by the same method as in Example 1. The results are shown in Table 1.

In Table 1, the neutral salt decomposition capacity, the amino group exchange capacity, and the proportion of the quaternary ammonium group in the total amount of functional groups before and after treatment of the electrolytic solution are described together in the same manner as in Example 1.

Comparative Example 1

An electrolytic solution S was passed through a column filled with a weakly basic anion exchange resin to measure the total ion exchange capacity and the neutral salt decomposition capacity of the weakly basic anion exchange resin before and after passing the liquid in the same manner as in Example 1, except that the weakly basic anion exchange resin having an acrylic-based resin as substrate and dimethylamino group as weakly basic anion exchange group was used.

The results are shown in Table 1.

On the other hand, from Table 1, it has been found that in Comparative Example 1, removal treatment of acidic impurities in a lithium-based electrolyte-containing solution with a lithium-based electrolyte dispersed in an carbonate ester was performed without using the specified weakly basic anion exchange resin, so that it was difficult to prevent the modification of the tertiary amino group into a quaternary amino group (quaternization reaction).

Example 5

An electrolytic solution was prepared by using an apparatus for producing an electrolytic solution for a lithium ion battery, as an aspect 1 of the production apparatus shown in FIG. 2.

In other words, as shown in FIG. 2, as an ion exchange unit 2 of an apparatus 1 for producing a non-aqueous electrolytic solution (apparatus for producing an electrolytic solution for a lithium ion battery), a column filled with a weakly basic anion exchange resin (macroporous-type) having styrene-divinylbenzene as substrate and dimethylamino group as weakly basic anion exchange group was prepared in the first place.

Subsequently, an electrolytic solution S with dissolved $LiPF_6$ at a concentration of 1 mol/L in a mixed solvent obtained by mixing ethylene carbonate (EC) and dimethyl carbonate (DMC) at a volume ratio of 1:1 was passed through the column at a flow rate of 40 (L/L-resin)/hr, by using a pump P, and the electrolytic solution after passing was stored in a tank T.

TABLE 1

| | | Example 1 | Example 2 | Example 3 | Example 4 | Comparative Example 1 |
|---|---|---|---|---|---|---|
| Ion exchange resin | Substrate | Styrene-base | Styrene-base | Styrene-base | Styrene-base | Acrylic-base |
| | Functional group | Dimethylamino group | Dimethylamino group | Dimethylamino group | Dimethylamino group | Dimethylamino group |
| Total ion exchange capacity (eq/L-R) | Before passing liquid | 1.21 | 1.32 | 1.80 | 1.86 | 1.61 |
| | After passing liquid | 0.85 | 0.94 | 0.97 | 1.02 | 1.15 |
| Neutral salt decomposition capacity (eq/L-R) | Before passing liquid | 0.06 | 0.21 | 0.30 | 0.47 | 0.11 |
| | After passing liquid | 0.33 | 0.38 | 0.47 | 0.52 | 0.87 |
| Amino group exchange capacity (eq/L-R) | Before passing liquid | 1.15 | 1.11 | 1.50 | 1.39 | 1.50 |
| | After passing liquid | 0.52 | 0.56 | 0.50 | 0.50 | 0.28 |
| Proportion of quaternary ammonium group in total amount of functional groups (%) | Before passing liquid | 5.0 | 15.9 | 16.6 | 25.3 | 6.8 |
| | After passing liquid | 38.8 | 40.4 | 48.5 | 51.0 | 75.7 |

From Table 1, it has been found that in Example 1 to Example 4, removal treatment of acidic impurities in a lithium-based electrolyte-containing solution with a lithium-based electrolyte dispersed in an carbonate ester is performed using one having a styrene-based resin as substrate and a tertiary amino group as weakly basic anion exchange group, in particular, having an amino group exchange capacity calculated by the equation described above in the range, so that in purification treatment by adsorbing acidic impurities such as hydrogen fluoride contained in an electrolytic solution for a lithium ion battery to a weakly basic anion exchange resin having a tertiary amino group, the purification treatment can be easily performed with the modification of the tertiary amino group as weakly basic anion exchange group into a quaternary amino group effectively prevented.

The concentration of hydrogen fluoride in the electrolytic solution before and after passing the liquid was measured by the following method. The results are shown in Table 2.

<Method for Measuring Concentration of Hydrogen Fluoride>

The whole hydrogen ion concentration calculated from neutralization titration with sodium hydroxide was converted into hydrogen fluoride and the resultant value was defined as the concentration of hydrogen fluoride.

Comparative Example 2

An electrolytic solution S was passed through the column filled with a weakly basic anion exchange resin, and the concentration of hydrogen fluoride in the electrolytic solution before and after passing the liquid was measured in the same manner as in Example 5, except that a weakly basic anion exchange resin having an acrylic-based resin as substrate and dimethylamino group as weakly basic anion exchange group (gel-type) was used.

The results are shown in Table 2.

Comparative Example 3

An electrolytic solution S was passed through the column filled with a weakly basic anion exchange resin, and the concentration of hydrogen fluoride in the electrolytic solution before and after passing the liquid was measured in the same manner as in Example 5, except that a weakly basic anion exchange resin having styrene-divinylbenzene as substrate and a polyamine group as weakly basic anion exchange group (macroporous-type) was used.

The results are shown in Table 2.

Comparative Example 4

An electrolytic solution S was passed through the column filled with a weakly basic anion exchange resin, and the concentration of hydrogen fluoride in the electrolytic solution before and after passing the liquid was measured in the same manner as in Example 5, except that a weakly basic anion exchange resin having an acrylic-based resin as substrate and a polyamine group as weakly basic anion exchange group (macroporous-type) was used.

The results are shown in Table 2.

Reference Example 2

The following solution was passed through the column filled with a weakly basic anion exchange resin, and the concentration of hydrogen fluoride in the electrolytic solution before and after passing the liquid was measured in the same manner as in Comparative Example 2, except that water with dissolved hydrogen fluoride at 100 mass ppm was passed through instead of the electrolytic solution with dissolved $LiPF_6$ at a concentration of 1 mol/L in a mixed solvent obtained by mixing ethylene carbonate (EC) and dimethyl carbonate (DMC) at a volume ratio of 1:1.

The results are shown in Table 3.

Reference Example 3

The following solution was passed through the column filled with a weakly basic anion exchange resin, and the concentration of hydrogen fluoride in the electrolytic solution before and after passing the liquid was measured in the same manner as in Comparative Example 3, except that water with dissolved hydrogen fluoride at 100 mass ppm was passed through instead of the electrolytic solution with dissolved $LiPF_6$ at a concentration of 1 mol/L in a mixed solvent obtained by mixing ethylene carbonate (EC) and dimethyl carbonate (DMC) at a volume ratio of 1:1.

The results are shown in Table 3.

TABLE 2

| | | Example 5 | Comparative Example 2 | Comparative Example 3 | Comparative Example 4 |
|---|---|---|---|---|---|
| Liquid to be passed | | Electrolytic solution ($LiPF_6$/ethylene carbonate and dimethyl carbonate) | | | |
| Ion exchange resin | Substrate | Styrene base | Acrylic base | Styrene base | Acrylic base |
| | Functional group | Dimethylamino group | Dimethylamino group | Polyamine | Polyamine |
| Concentration of hydrogen fluoride (mass ppm) | Before passing liquid | 100 | 100 | 100 | 100 |
| | After passing liquid | <10 | 29 | 29 | 31 |

* In the table, "<10" means less than 10 mass ppm.

Reference Example 1

The following solution was passed through the column filled with a weakly basic anion exchange resin, and the concentration of hydrogen fluoride in the electrolytic solution before and after passing the liquid was measured in the same manner as in Example 5, except that water with dissolved hydrogen fluoride at 100 mass ppm was passed through instead of the electrolytic solution with dissolved $LiPF_6$ at a concentration of 1 mol/L in a mixed solvent obtained by mixing ethylene carbonate (EC) and dimethyl carbonate (DMC) at a volume ratio of 1:1.

The results are shown in Table 3.

Reference Example 4

The following solution was passed through the column filled with a weakly basic anion exchange resin, and the concentration of hydrogen fluoride in the electrolytic solution before and after passing the liquid was measured in the same manner as in Comparative Example 4, except that water with dissolved hydrogen fluoride at 100 mass ppm was passed through instead of the electrolytic solution with dissolved $LiPF_6$ at a concentration of 1 mol/L in a mixed solvent obtained by mixing ethylene carbonate (EC) and dimethyl carbonate (DMC) at a volume ratio of 1:1.

The results are shown in Table 3.

TABLE 3

| | | Reference Example 1 | Reference Example 2 | Reference Example 3 | Reference Example 4 |
|---|---|---|---|---|---|
| Liquid to be passed | | Water | | | |
| Ion exchange resin | Substrate | Styrene-base | Acrylic-base | Styrene-base | Acrylic-base |
| | Functional group | Dimethylamino group | Dimethylamino group | Polyamine | Polyamine |

TABLE 3-continued

|  |  | Reference Example 1 | Reference Example 2 | Reference Example 3 | Reference Example 4 |
|---|---|---|---|---|---|
| Concentration of hydrogen fluoride (mass ppm) | Before passing liquid | 100 | 100 | 100 | 100 |
|  | After passing liquid | <10 | <10 | <10 | <10 |

* In the table, "<10" means less than 10 mass ppm.

From Table 2, it has been found that in Example 5, removal treatment of acidic impurities in a lithium-based electrolyte-containing solution with a lithium-based electrolyte dispersed in an carbonate ester was performed using a specified weakly basic anion exchange resin having a styrene-based resin as substrate and a tertiary amino group as weakly basic anion exchange group, so that the acidic impurities were effectively removed.

On the other hand, from Table 2, it has been found that in Comparative Example 2 to Comparative Example 4, removal treatment of acidic impurities in a lithium-based electrolyte-containing solution with a lithium-based electrolyte dispersed in an carbonate ester was performed without using the specified weakly basic anion exchange resin, so that it was difficult to effectively remove the acidic impurities.

It has been also found that from the results in Reference Example 1 to Reference Example 4 shown in Table 3, in the case of removing acidic impurities in water, the acidic impurities can be effectively removed independently of the types of ion exchange resin.

Industrial Applicability

According to the present invention, an apparatus for producing a non-aqueous electrolytic solution and a method for producing a non-aqueous electrolytic solution, capable of easily performing purification treatment by removal of acidic impurities such as hydrogen fluoride contained in a non-aqueous electrolytic solution, can be provided.

REFERENCE SIGNS LIST

1: APPARATUS FOR PRODUCING NON-AQUEOUS ELECTROLYTIC SOLUTION
2: ACID ABSORPTION APPARATUS

The invention claimed is:

1. An apparatus for producing a non-aqueous electrolytic solution comprising:
an ion exchange unit accommodating a weakly basic anion exchange resin through which an alkali metal salt electrolyte-containing solution having the alkali metal salt electrolyte dispersed in a carbonate ester is passed to obtain the non-aqueous electrolytic solution,
wherein the weakly basic anion exchange resin has a styrene-based resin as substrate and a tertiary amino group as weakly basic anion exchange group, and has a total ion exchange capacity of 0.1 to 3.0 eg/L-R before treatment of the alkali metal salt electrolyte-containing solution.

2. The apparatus for producing the non-aqueous electrolytic solution according to claim 1, wherein the weakly basic anion exchange resin has a styrene-based resin as substrate and a tertiary amino group represented by the following general formula (I) as weakly basic anion exchange group:

[Chemical Formula 1]

(I)

wherein $R^1$ and $R^2$ are hydrocarbon groups having 1 to 3 carbon atoms, which may be the same or different from each other, and * represents a bonding site bonding with a substrate or a bonding group for bonding to a substrate.

3. The apparatus for producing the non-aqueous electrolytic solution according to claim 2, wherein the weakly basic anion exchange group is represented by the following general formula (II):

[Chemical Formula 2]

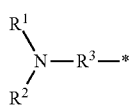

(II)

wherein $R^1$ and $R^2$ are hydrocarbon groups having 1 to 3 carbon atoms, which may be the same or different from each other, $R^3$ is a hydrocarbon group having 1 to 3 carbon atoms, and * represents a bonding site bonding with a substrate.

4. The apparatus for producing a non-aqueous electrolytic solution according to claim 2, wherein the weakly basic anion exchange group represented by the general formula (I) or general formula (II) is a dimethylaminomethyl group.

5. The apparatus for producing the non-aqueous electrolytic solution according to claim 1, wherein the styrene-based resin is a styrene-divinylbenzene copolymer.

6. The apparatus for producing the non-aqueous electrolytic solution according to claim 1, wherein the non-aqueous electrolytic solution is an electrolytic solution for a lithium ion battery.

7. A method for producing a non-aqueous electrolytic solution comprising:
passing an alkali metal salt electrolyte-containing solution having the alkali metal salt electrolyte dispersed in a carbonate ester through an ion exchange unit accommodating a weakly basic anion exchange resin to obtain the non-aqueous electrolytic solution,
wherein the weakly basic anion exchange resin has a styrene-based resin as substrate and a tertiary amino group as weakly basic anion exchange group, and has a total ion exchange capacity of 0.1 to 3.0 eg/L-R before treatment of the alkali metal salt electrolyte-containing solution.

8. The method for producing the non-aqueous electrolytic solution according to claim 7,
wherein the weakly basic anion exchange resin has a styrene-based resin as substrate and a tertiary amino group represented by the following general formula (I) as weakly basic anion exchange group:

[Chemical Formula 3]

(I)

wherein $R^1$ and $R^2$ are hydrocarbon groups having 1 to 3 carbon atoms, which may be the same or different from each other, and * represents a bonding site bonding with a substrate or a bonding group for bonding to a substrate.

9. The method for producing the non-aqueous electrolytic solution according to claim 8, wherein the weakly basic anion exchange group is represented by the following general formula (II):

[Chemical Formula 4]

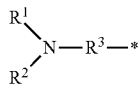
(II)

wherein $R^1$ and $R^2$ are hydrocarbon groups having 1 to 3 carbon atoms, which may be the same or different from each other, $R^3$ is a hydrocarbon group having 1 to 3 carbon atoms, and represents a bonding site bonding with a substrate.

10. The method for producing the non-aqueous electrolytic solution according to claim 8, wherein the weakly basic anion exchange group represented by the general formula (I) or general formula (II) is a dimethylaminomethyl group.

11. The method for producing the non-aqueous electrolytic solution according to claim 7, wherein the styrene-based resin is a styrene-divinylbenzene copolymer.

12. The method for producing the non-aqueous electrolytic solution according to claim 7, wherein the non-aqueous electrolytic solution is an electrolytic solution for a lithium ion battery.

* * * * *